(12) United States Patent
Dreier et al.

(10) Patent No.: US 7,334,771 B2
(45) Date of Patent: Feb. 26, 2008

(54) DEVICE FOR LOCKING AND/OR SEALING A CONDUIT

(75) Inventors: Rainer Dreier, Weyer (AT); Herbert Silbernagl, Amstetten (AT)

(73) Assignee: Voest-Alpine Industrieanlagenbau GmbH & Co. (AT)

( * ) Notice: Subject to any disclaimer, the term of this patent is extended or adjusted under 35 U.S.C. 154(b) by 39 days.

(21) Appl. No.: 10/527,521

(22) PCT Filed: Aug. 13, 2003

(86) PCT No.: PCT/EP03/08977

§ 371 (c)(1),
(2), (4) Date: Apr. 14, 2005

(87) PCT Pub. No.: WO2004/027297

PCT Pub. Date: Apr. 1, 2004

(65) Prior Publication Data

US 2005/0247902 A1  Nov. 10, 2005

(30) Foreign Application Priority Data

Sep. 11, 2002  (EP) ................................. 02020302

(51) Int. Cl.
*F16K 35/00* (2006.01)
(52) U.S. Cl. .................... 251/88; 251/315.1; 251/335.2
(58) Field of Classification Search ............... 251/84, 251/85, 88, 315.1, 315.11, 335.2; 137/375
See application file for complete search history.

(56) References Cited

U.S. PATENT DOCUMENTS 3,014,690 A * 12/1961 Boteler ...................... 251/174
3,173,648 A *  3/1965 McGuire et al. ............ 251/188
3,281,112 A   10/1966 Walker ....................... 251/174

(Continued)

FOREIGN PATENT DOCUMENTS

DE    19535204    3/1997

(Continued)

OTHER PUBLICATIONS

International Search Report for PCT/EP2003/008977 dated Nov. 28, 2003.

*Primary Examiner*—John Rivell
*Assistant Examiner*—John K. Fristoe, Jr.
(74) *Attorney, Agent, or Firm*—Ostrolenk, Faber, Gerb & Soffen, LLP (57) ABSTRACT

The invention relates to a blocking apparatus for blocking and/or sealing off a line for transporting—preferably hot—media, in particular dust-laden gases, preferably for blocking and/or sealing off a line for transporting hot gases which may be laden with solid particles, having a movable closure body (2) and at least one sealing element (9), in particular a seat ring, against which the closure body bears in the blocking position, and having a device for rotating the closure body (11) about an axis of rotation, in particular a shaft, to which the closure body is connected. In this blocking apparatus, the closure body, by means of a suitable flexible linkage to the device for rotating the closure body, is mounted such that it can move in the direction of the axis of rotation and/or in a direction which is perpendicular with respect thereto, such that it slides on the sealing element.

30 Claims, 5 Drawing Sheets

U.S. PATENT DOCUMENTS

| | | | |
|---|---|---|---|
| 3,767,162 A * | 10/1973 | Olsson | 251/84 |
| 4,293,163 A | 10/1981 | Braddick | 251/283 |
| 4,363,681 A * | 12/1982 | Williams | 156/64 |
| 4,428,561 A * | 1/1984 | Thompson | 251/174 |
| 5,037,065 A * | 8/1991 | Hirz et al. | 251/214 |
| 5,193,780 A | 3/1993 | Franklin | 251/68 |

FOREIGN PATENT DOCUMENTS

| | | |
|---|---|---|
| FR | 77939 | 5/1962 |

\* cited by examiner

DEVICE FOR LOCKING AND/OR SEALING A CONDUIT

BACKGROUND OF THE INVENTION

The invention relates to a blocking apparatus for blocking and/or sealing off a line for transporting—preferably hot—media, in particular dust-laden gases, preferably for blocking and/or sealing off a line for transporting hot gases which may be laden with solid particles, having a movable closure body and at least one sealing element, in particular a seat ring, against which the closure body bears in the blocking position, and having a device for rotating the closure body about an axis of rotation, in particular a shaft, to which the closure body is connected.

The prior art has disclosed various blocking apparatuses which are of only limited use for transporting a hot gas, optionally laden with solid particles. The hot gas laden with solid particles generally severely impairs the closing and/or sealing action of the blocking apparatuses which are known from the prior art.

SUMMARY OF THE INVENTION

It is an object of the present invention to further develop a blocking apparatus for blocking or sealing off a line for transporting preferably hot gases, particularly dust laden gases wherein the apparatus is at an open area along the line and a method for operating such a blocking apparatus such that more economic use of a blocking apparatus of this type and of a method of this type for transporting a hot gas, optionally laden with—in particular fine—solid particles, is possible.

In accordance with the apparatus of the invention, this object is achieved by a sealing element at the open area of the line and a movable closure body which selectively bears against or does not bear against the sealing element. A rotation device, in particular a shaft rotates the closure body. A flexible linkage allows the shaft to move along the axis and also perpendicular thereto, and the closure body slides on the sealing element, enabling the closure body to be moved by a spacer. That apparatus is operable in accordance with a method of the invention. A flexible linkage moves the closure body along and perpendicular to the axis and against the sealing element.

The apparatus according to the invention and the method according to the invention ensure that the position and/or location of the closure body can be suitably matched to the sealing body. This measure is of considerable importance in particular in the situation in which exact guidance of the closure body and therefore blocking and/or sealing is made more difficult and/or impossible by deposits in the region of the closure body and/or of the sealing element, for example caused by the introduction of solid particles.

According to one embodiment of the apparatus according to the invention, a—preferably flexible and/or dust-tight—seal, in particular a bellows, which on one side is connected to the device for actuating the closure body and on the other side is connected to the closure body, in each case in such a manner that the connecting location between the closure body and the device which actuates it can be sealed off by the seal, is arranged at the device for actuating, in particular rotating, the closure body. According to a further particular embodiment, the seal used is made from a particularly temperature-resistant material.

According to an additional embodiment of the invention, the seal protects the specifically stressed connecting location between the closure body and the device which actuates it.

According to a particular embodiment of the invention, the seal, in particular the bellows, is connected to the closure body and/or the device for actuating the closure body by a welded joint and/or some other form of—preferably dust-tight—connection.

According to a particular embodiment of the apparatus according to the invention, in which the closure body on one side has a recess in which the device for actuating the closure body, in particular the shaft, and/or an intermediate piece for connecting the device for actuating the closure body to the closure body engages, the seal, in particular the bellows, is arranged in such a manner that it is possible to prevent solid particles from being introduced into the recess in the closure body, in particular in the region where the device for actuating the closure body engages in the recess in the closure body.

The intermediate piece according to the invention may, for example, be a piece of metal, in particular a metal spring, which is positioned through recesses at the closure body and at the device for actuating the closure body and produces the connection between the two components by means of a positive lock.

The fact that it is possible to prevent solid particles from being introduced into the recess in the closure body ensures that the movement or mobility of the closure body cannot be impeded by impurities, for example dust, penetrating in particular into the recess. Since, according to a particular embodiment of the apparatus according to the invention, the closure body is generally only connected in a locked manner in one direction and/or plane to the device which actuates it, in particular a shaft, the closure body can react to any deposits on the sealing elements and change position. This measure generally ensures that the closure body, despite deposits on the sealing elements, closes off the blocking apparatus in a substantially sealed manner. By contrast, if, for example, foreign bodies were to pass into the recess in the closure body in which the shaft engages, the possibility of the closure body moving would be significantly restricted. A substantially sealed, optionally dust-tight and/or gastight, closure of the blocking apparatus could not then be realized.

According to a further preferred embodiment of the invention according to the invention, the closure body is connected to the device for actuating the closure body, in particular the shaft, by an articulated connection, for example by using a universal joint. Also according to this further particular embodiment of the invention, it is extremely important to seal the connecting location between the actuated device for actuating the closure body, in particular the shaft, and the closure body itself, since the penetration of media, in particular dusts or other impurities, for example through the formation of deposits, can significantly impair the actuability of the closure body and/or the function of the articulated connection.

According to a particular embodiment of the apparatus according to the invention, the seal at least partially seals off, in a gastight manner, the front part, facing the closure body, of the device for actuating the closure body, in particular the shaft.

According to a particular embodiment of the apparatus according to the invention, a cavity, in particular a bore, which has at least two openings, one of the openings being arranged in the front part, facing the closure body, of the device for actuating the closure body, in particular the shaft, is provided at the device for actuating the closure body, in particular at the shaft.

According to one particular embodiment of the blocking apparatus according to the invention, the closure body is of at least partially spheroidal and rotatable design and has a through-flow passage.

According to one particular embodiment of the blocking apparatus according to the invention, a fixing element, for example a disk spring, is provided, by means of which the sealing element is flexibly and/or resiliently mounted.

According to a particular embodiment of the apparatus according to the invention, the first opening is arranged in the region of the sealed connection between the closure body and the device which actuates it.

According to a particular embodiment of the apparatus according to the invention, the second opening of the cavity can be closed off, in particular in a gastight manner, by a closure.

According to a particular embodiment of the invention, the position and/or location of the closure body, preferably in the direction of the shaft axis, can be altered by a spacer, in particular by what is known as a ball-stopper, which acts in particular on the closure body at a point in the direction of the shaft axis and can be actuated, in particular hydraulically, during operation.

According to the feature of the invention, this allows flexible positioning of the closure body.

The feature of the invention allows the location and/or position of the closure body, according to a preferred embodiment of the invention, to be flexibly altered with respect to the sealing element, thereby achieving an improved sealing performance. In particular, this adjustment option for the closure body makes it possible, preferably during operation, i.e. for preference while the hot gas is passing through it, to react to the formation of deposits on the closure body and/or on the sealing element and therefore to achieve a satisfactory closing or sealing action despite the formation of deposits on the closure body in the region of the sealing element.

According to one particular embodiment of the invention, the closure body is of at least partially spheroidal and rotatable design and if appropriate has a through-flow passage.

However, the invention is not restricted to a spheroidal closure body and is also suitable for other closure bodies and closure mechanisms.

According to one particular embodiment of the invention, the blocking apparatus has at least in each case one inlet connection piece and outlet connection piece, arranged at the corresponding end of the blocking valve and if appropriate aligned with one another, which in turn each have an external diameter and internal diameter, the external diameter being formed by an—optionally metallic—shell and the internal diameter being formed by an—optionally metallic—inliner. According to a particular embodiment of the invention, an insulating material for thermal insulation, in particular a refractory material, particularly preferably a refractory lining made from refractory material, is arranged between the inliner and the shell. According to a further preferred embodiment, if appropriate in addition, an insulating material is arranged in the region of the blocking valve in order to protect the corresponding part of the valve from extreme, in particular especially high, temperatures.

According to a particular embodiment of the invention, the insulating material is refractory casting materials, preferably casting materials with a high aluminum oxide content. This insulating material has proven particular expedient in tests.

According to one particular embodiment of the invention, the inliner is produced from highly heat-resistance, wear-resistant, in particular metallic material(s).

The provision of a refractory material between an outer, generally metallic shell and an inliner allows service lives of the blocking apparatus to be significantly lengthened compared to the prior art. According to a particular embodiment of the invention, this particular embodiment is particularly suitable for the blocking apparatus to be used in an installation for transporting a hot gas laden with fine solid particles, in particular for transporting—in particular hot—fine ores in a reduction plant for the reduction of ores.

According to a particular embodiment of the invention, a connecting element for supporting the inliner on the metallic shell is provided between the metallic shell and the inliner, preferably in the region of the blocking valve, if appropriate the connecting element bearing against the sealing element and at least partially supporting the latter.

According to a particular embodiment of the invention, a fixing element, for example a disk spring is provided, by means of which the sealing element is flexibly and/or resiliently mounted.

According to one particular embodiment of the method according to the invention, the connecting location between the closure body and the device for actuating the closure body is sealed off with respect to the environment, in particular so as to prevent the ingress of impurities, by a—preferably flexible—seal, in particular a bellows.

According to a particular embodiment of the method according to the invention, a cavity, in particular a bore, which has at least two openings, a first opening being arranged in the front part, facing the closure body, of the device for actuating the closure body, in particular the shaft, is arranged at the device for actuating the closure body, in particular the shaft.

According to a particular embodiment of the method according to the invention, the first opening is arranged in the region of the sealed connection between the closure body and the device which actuates it.

According to a particular embodiment of the method according to the invention, the second opening of the cavity is closed off, in particular in a gastight manner, by a closure.

According to a particular embodiment of the method according to the invention, the cavity is filled by a gaseous or liquid medium, in particular compressed air or another gas, at a high pressure, in particular a higher pressure than the ambient pressure surrounding the blocking apparatus.

The medium which is under a high pressure reduces the thermal coupling of the device for actuating the closure body to the closure body and also where appropriate damps any relative movements between the actuating device and the closure body.

According to a particular embodiment of the method according to the invention, the medium in the cavity is held substantially at a constant pressure level, in particular above the ambient pressure surrounding the blocking apparatus.

According to a particular embodiment of the method according to the invention, the location and/or position of the closure body is altered in the direction of the axis of rotation and/or in a direction which is perpendicular with respect thereto, in particular during operation of the blocking apparatus, by a—preferably hydraulic—spacer.

According to a particular embodiment of the invention, the present blocking apparatus or the present valve is what is known as a floating ball design, which in the closed state provides the ball (closure body) with the option of pressing against the seat (sealing element) which is remote from the pressure.

BRIEF DESCRIPTION OF THE DRAWINGS

One particular embodiment of the invention is illustrated below with reference to a plurality of diagrammatic, non-limiting drawings, in which:

FIG. 3b is a section A-A on FIG. 3a;

DESCRIPTION OF A PREFERRED EMBODIMENT

Figure 1:
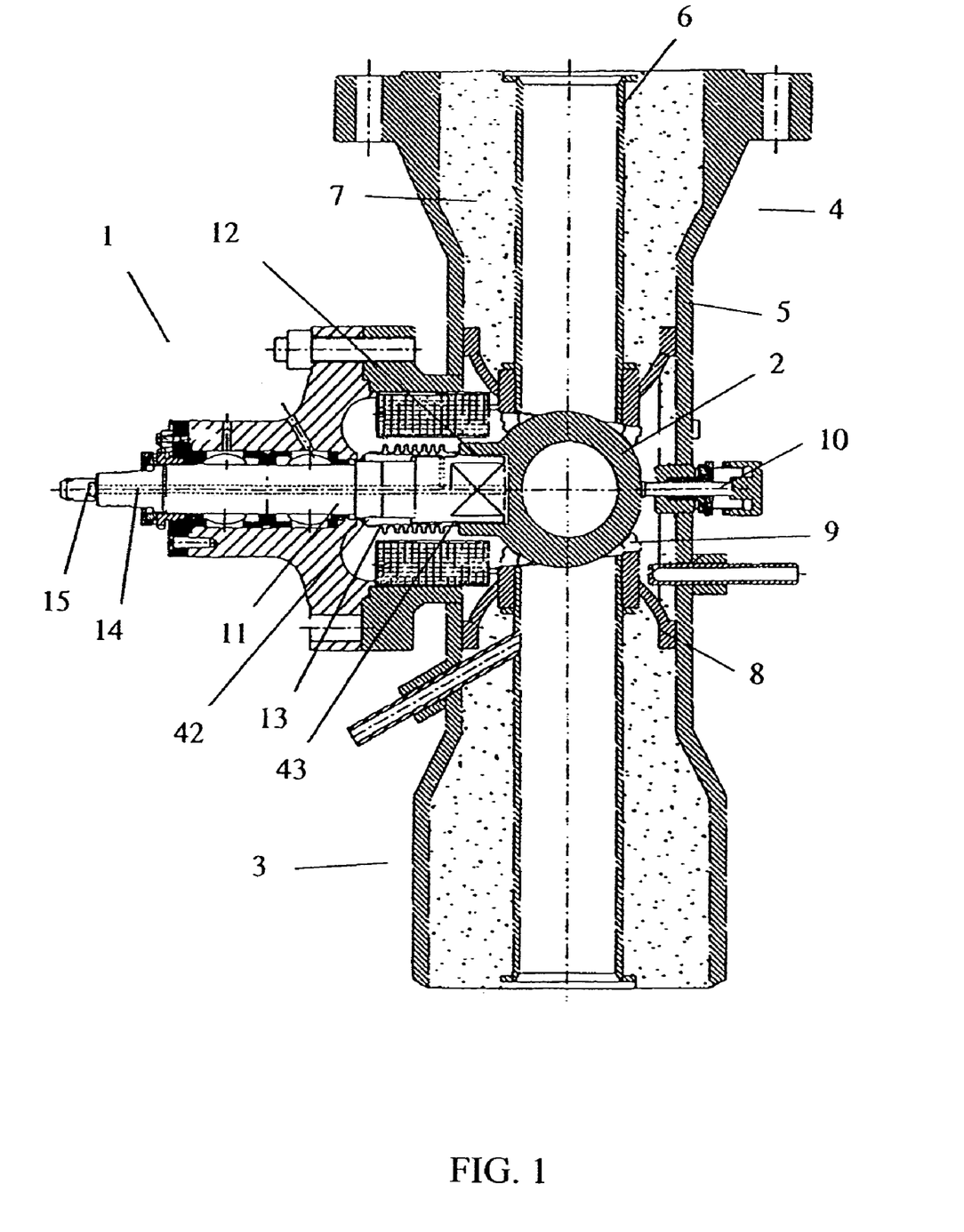
FIG. 1 shows a blocking apparatus for hot gases optionally laden with fine solid particles.

FIG. 1 illustrates a blocking apparatus 1, in particular a blocking valve, which has a movable spheroidal closure body 2 and an inlet connection piece 3 and an outlet connection piece 4. The inlet connection piece 3, like the outlet connection piece 4, has an outer shell 5, preferably made from refractory material, as well as an inliner 6 made from highly heat-resistant and wear-resistant, in particular metallic, material. A refractory and/or high-temperature-resistant material 7, in particular a refractory lining, is arranged between the inliner 6 and the outer shell 5, with the result that the outer shell 5 is at least partially insulated or protected from the temperatures which occur in the region of the inliner 6.

The inliner 6 is supported against the outer shell by connecting elements 8 and thereby protects and stabilizes the refractory material. Sealing elements 9 bear against the connecting elements 8 and are in turn connected to the closure body 2, thereby allowing a sealing action.

On one side, the closure body is held in position by a spacer (ball stopper) 10. The spacer 10, which, for example, is actuated hydraulically, can be adjusted even at high temperatures, in particular during operation of the blocking apparatus 1.

On the other side of the closure body 2, a shaft 11 engages in a recess 12 at the closure body. The recess 12 is configured in such a manner that the shaft 11, when the valve is open in the direction of the direction of flow of the gas, is connected in a locking, in particular positively locking, manner to the closure body 2.

The shaft 11, as illustrated in FIG. 1, is connected, in particular welded, to a bellows 13 at location 42, the bellows 13, at another location 43, in turn being connected, preferably in a gastight manner, and in particular by welding, to the closure body 2. The bellows 13, which therefore seals the front part of the shaft 11 and the connection between shaft and closure body, on the one hand prevents particles from being introduced into the recess 12 in the closure body 2 and on the other hand prevents the shaft 11, in particular the front part of the shaft, from being directly exposed to the hot and dust-laden gases.

According to a particular embodiment, the bellows 13 itself comprises a plurality of joined-together and folded metal sheets, and according to a particularly preferred embodiment it has a spring action.

Furthermore, the shaft 11 is provided with a bore 14 which extends through the entire shaft and at one end is closed off by a gastight closure 15. Gas is introduced into the bore in the shaft so that a super-atmospheric pressure is formed in the resulting cavity. Since the shaft 11 generally does not bear against the closure body 2 in the direction of the shaft axis, a gas cushion is formed in the recess 12 between the shaft 11 and the closure body 2 and/or the bellows 13, which cushion damps any vibrations and movements. This gas cushion at least partially thermally insulates the shaft 11 with respect to the closure body 2.

Figure 2:
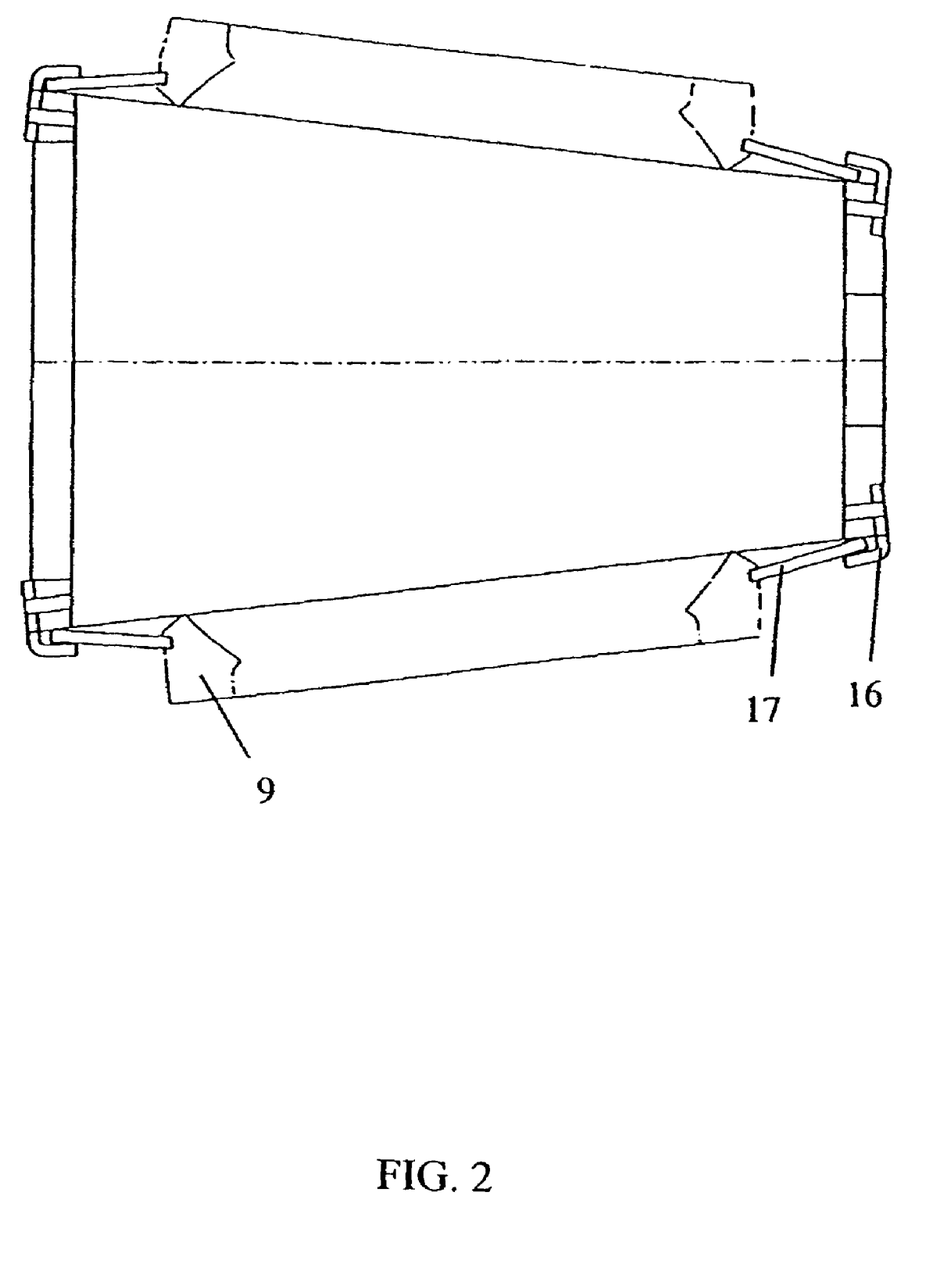
FIG. 2 shows an apparatus for mounting a sealing element for use in a blocking apparatus for hot gases optionally laden with solid particles.

FIG. 2 illustrates an embodiment of a way of fixing the sealing element 9. The sealing element 9 is held in position by a support ring 16 by means of one or more disk springs 17.

Figure 3A:
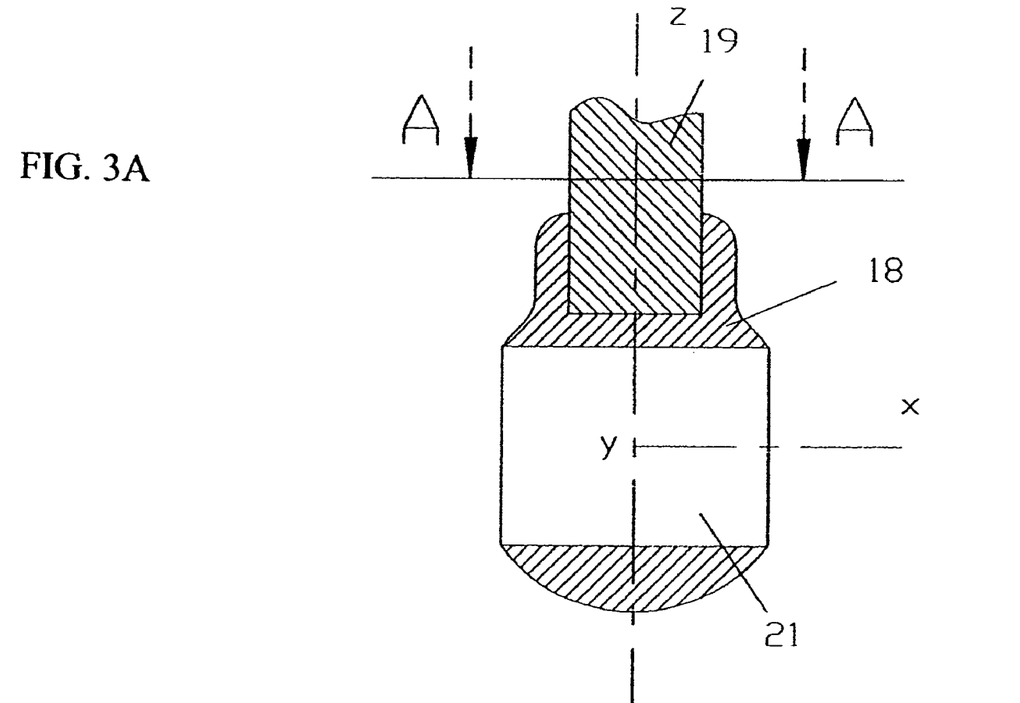
FIG. 3a shows an elevational cross section of a closure body having a device for actuating the closure body.
Figure 3B:
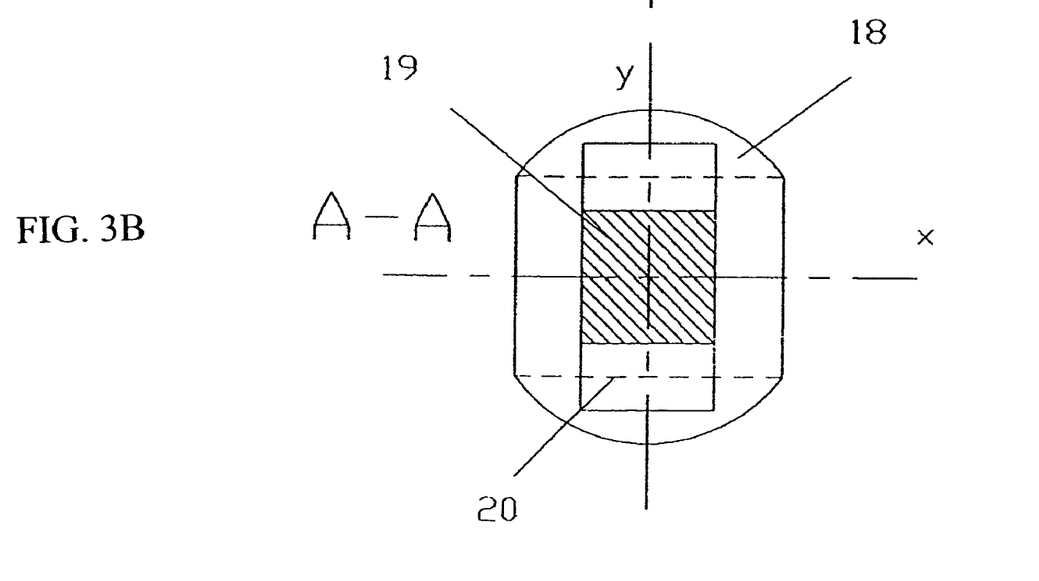

FIGS. 3a and 3b illustrate a spheroidal closure body 18 having a device for actuating the closure body, in particular a shaft 19. It can be seen from FIG. 3b that the closure body has a recess 20 in which the device 19 for actuating the closure body engages. It can also be seen that the shaft is connected in a locking manner to the closure body in a direction x, whereas in a direction y, in particular in a direction which is perpendicular with respect to the direction of the locking connection, the closure body 18 can move relative to the device 19 for actuating the closure body. This ensures an optimum setting of the closure body with respect to the sealing element, which is very important in particular in the event of deposits occurring, preferably on the sealing element and/or on the closure body itself. The closure body 18 can be rotated about an axis of rotation z by the device for actuating the closure body 19. According to a preferred embodiment of the invention, the direction of the axis x, which represents the direction of the locking connection between the closure body and the device for actuating the closure body, corresponds to the direction in which the through-flow passage 21 passes through the closure device 18.

Figure 4A:
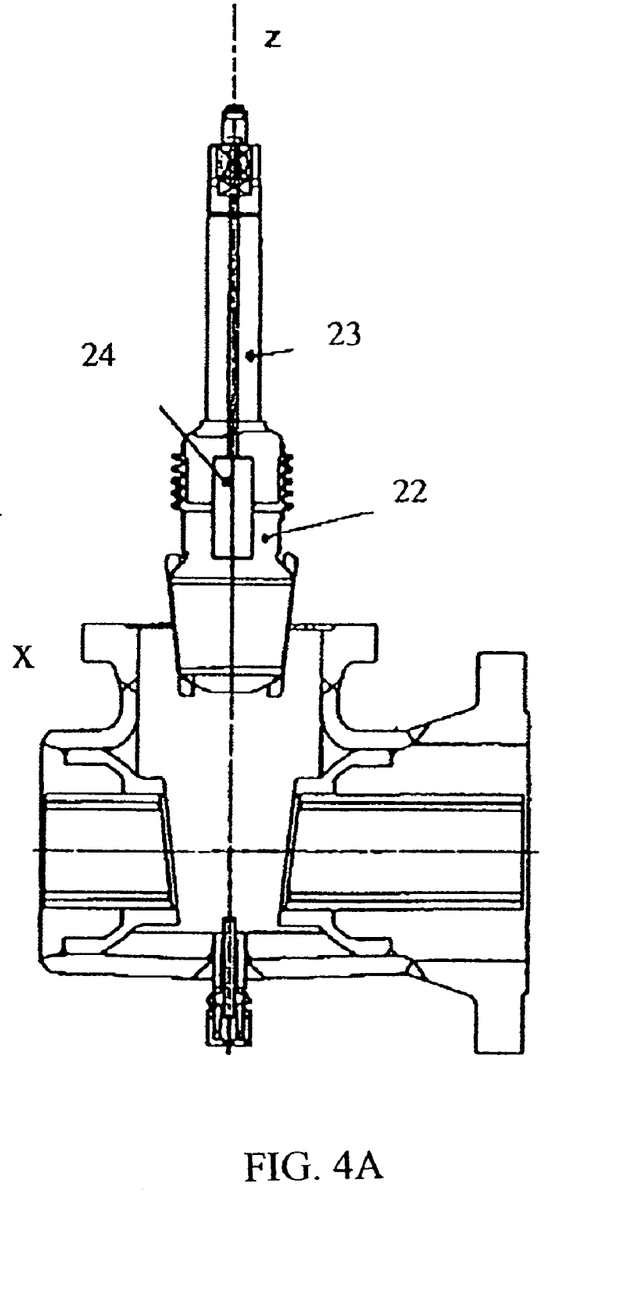
FIG. 4a shows a further preferred embodiment of a blocking apparatus.
Figure 4B:
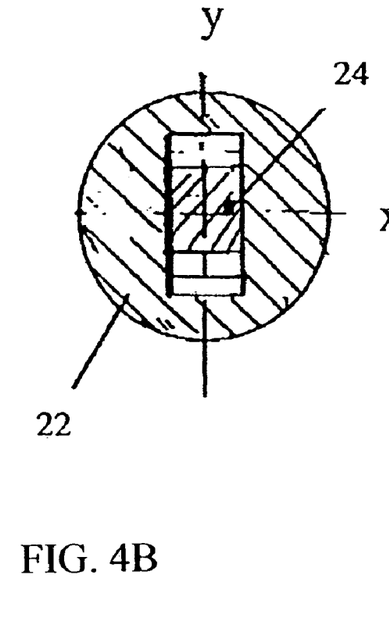
FIG. 4b shows the closure body thereof.

FIGS. 4a and 4b illustrate a further particular embodiment of a blocking apparatus, the connection between closure body and a device for actuating this closure body being produced by means of a free intermediate piece which has a positively locking action in a direction (x) and can slide in directions (y) and (z). As can be seen from FIGS. 4a and 4b, for the sake of clarity, the spheroidal closure body 22 together with the device 23 which actuates it have been illustrated separately in FIG. 4b and outside the actual blocking apparatus, in particular the passage which is to be closed off and the corresponding sealing elements. As can also be seen from FIG. 4, a spacer is located at the blocking apparatus, in particular at the blocking passage, opposite the device for actuating the closure body. FIG. 4b illustrates a spheroidal closure body 22 having a device for actuating the closure body 23, in particular a shaft. It can be seen from this illustration that an intermediate piece 24 engages between the recess in the closure body 22 and the device for actuating the closure body 23. It can also be seen that the shaft is connected in a locking manner in a direction x to the closure body, whereas in a direction y, in particular in a direction which is perpendicular with respect to the direction x of the locking connection, the closure body can be moved relative to the device for actuating the closure body. This ensures optimum positioning of the closure body with respect to the sealing element, which is of great importance in particular in the event of deposits being formed, preferably on the sealing element and/or on the closure body itself, and in order to absorb thermal expansions. The closure body 22 can be rotated about an axis of rotation z by the device for actuating the closure body 23 via the intermediate piece 24. According to a particular embodiment of the invention, the direction of the axis x, which illustrates the direction of the locking connection of the closure body to the device for actuating the closure body, corresponds to the direction in which the through-flow passage passes through the closure device 22. The design with the intermediate piece gives the advantage that the actuating device (shaft) is thermally decoupled from the closure element and therefore the conduction of heat into the shaft and therefore into the stopper sleeve and bearing of the shaft is reduced.

Figure 5:
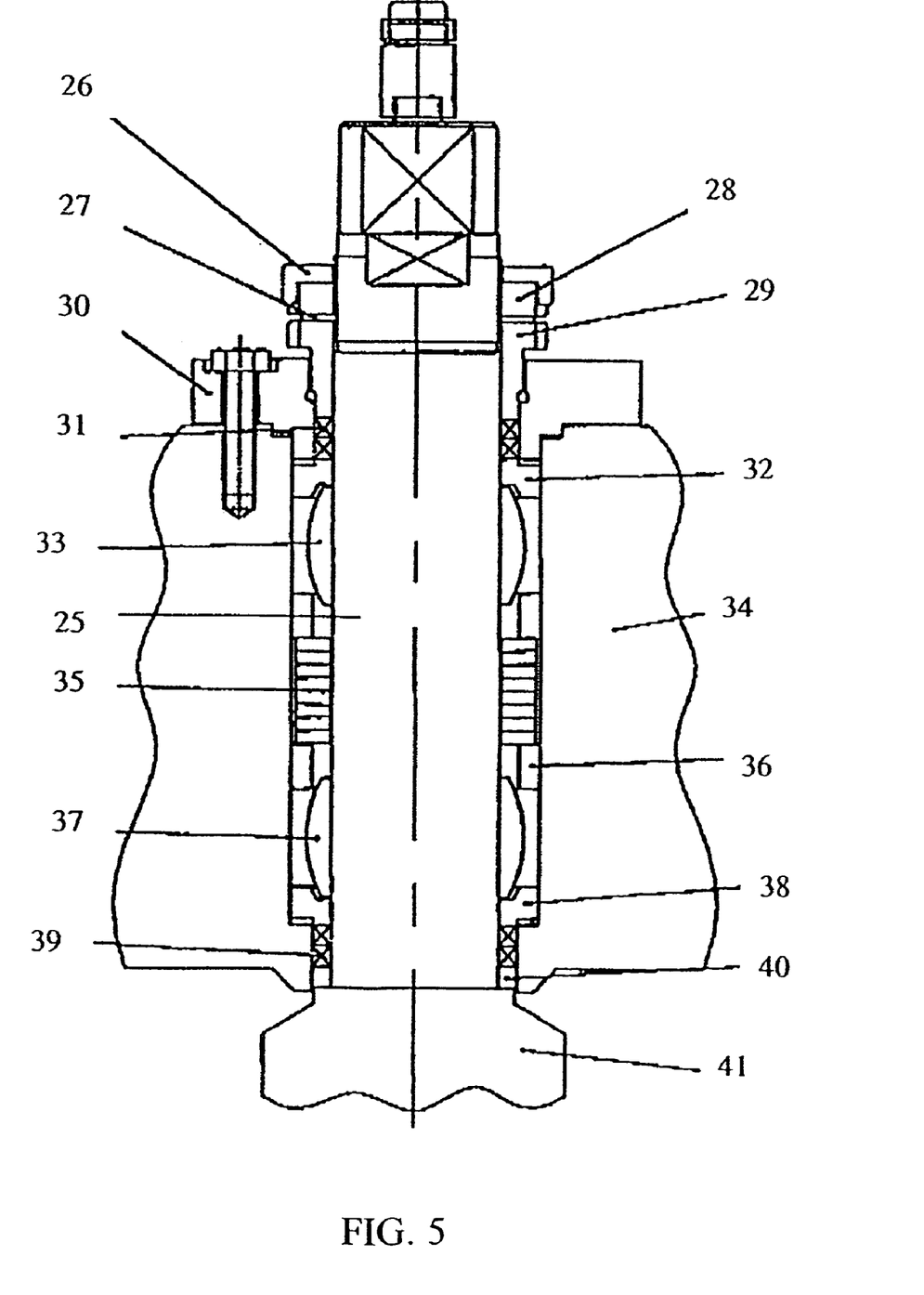
FIG. 5 shows the bearing and sealing of the apparatus for actuating the closure body.

FIG. 5 illustrates the sealing and bearing of the device for actuating the closure body. The illustration reveals two sealing gaskets. The compression of the sealing gaskets which is required is applied by means of an adjustment nut which acts on the upper sealing gasket. The distribution of force between the upper sealing gasket and the lower sealing gasket is achieved via a centrally arranged disk spring assembly. The two ball bearings are also held in position via spacers. The disk spring gasket means that the prestressing of the sealing gasket is ensured even in the event of thermal expansion of the shaft in the axial direction without the adjustment nut having to be constantly adapted to the operating states. The figure specifically illustrates the device 25 for actuating the closure body, as well as a metal securing plate 26, a pressure disk 27, a closure nut 28, a clamping nut 29, a flat steel anchoring means 30, a first sealing gasket 31, a pressure disk 32, a first ball bearing 33, a protective cage 34, a spring gasket 35, a spacer 36, a further ball bearing 37, a further pressure disk 38, a further sealing gasket 39, a further spacer 40, and also the device for actuating the closure body 41, in particular the shaft 25, itself.

The invention claimed is:

1. A blocking apparatus for blocking or sealing off a line for transporting dust-laden gases, wherein the line has an open area along a length of the line at which the line may be blocked or sealed;
the apparatus including
a sealing element at the open area of the line;
a movable closure body which selectively bears against the sealing element in a blocking or sealing position of the closure body;
a rotation device connected to the closure body for rotating the closure body about an axis of rotation, the rotation device extending along the rotation axis;
a flexible linkage between the rotation device and the closure body, so constructed that the closure body can move along a direction of the axis of rotation and also can move in a direction which is perpendicular to the axis of rotation, such that the closure body slides on the sealing element whereby the position and location of the closure body may be altered at least along the direction of the axis of rotation; and
a spacer which is hydraulically actuated to apply a force to move the closure body at least along the direction of the axis of rotation at least during operation of the blocking apparatus.

2. The blocking apparatus as claimed in claim 1, wherein the flexible linkage comprises:
a flexible seal connected to the rotation device and the closure body, each connection being such that a connecting location between the closure body and the rotation device can be sealed off by the seal, and the flexible seal is at the device for rotating the closure body.

3. The blocking apparatus as claimed in claim 2, wherein the closure body includes a recess therein in which the rotation device engages, and the seal is arranged such that the seal may prevent solid particles from being introduced into the recess in the closure body where the device for rotating the closure body engages in the recess.

4. The blocking apparatus as claimed in claim 2, wherein the seal is shaped and positioned to at least partially seal off, in a gastight manner, a front part, facing the closure body, of the rotation device.

5. The blocking apparatus as claimed in claim 2, further comprising a cavity in the rotation device, the cavity having at least two openings, including a first opening arranged in a front part facing the closure body.

6. The blocking apparatus as claimed in claim 5, wherein the first opening is arranged in a region of a sealed connection between the closure body and the rotation device.

7. The blocking apparatus as claimed in claim 5, further including a second opening of the cavity and a closure which is operable to close off the second opening in particular in a gastight manner.

8. The apparatus of claim 7, wherein the rotation device comprises a shaft extending along the axis of rotation and has an opposite end at which the second opening is defined.

9. The apparatus of claim 5, wherein the rotation device comprises a shaft extending along the axis of rotation and the shaft has an end at which the front part thereof is located.

10. The apparatus of claim 2, wherein the flexible seal comprises a bellows.

11. The blocking apparatus as claimed in claim 1, wherein the closure body is of at least partially spheroidal shape and is rotatable around the axis.

12. The apparatus of claim 11, wherein the closure body includes a through flow passage.

13. The blocking apparatus as claimed in claim 1, further comprising:
an inlet connection piece and an outlet connection piece, arranged at respective corresponding ends of the blocking apparatus,
each connection piece having an external diameter and an internal diameter, wherein the external diameter is defined by a metallic shell and the internal diameter is defined by an inliner; and
a body of thermal insulation, arranged between the inliner and the metallic shell.

14. The blocking apparatus as claimed in claim 13, further comprising a connecting element between the metallic shell and the inliner for supporting the inliner on the metallic shell.

15. The apparatus of claim 14, wherein the connecting element is between the metallic shell and the inliner in the region of the blocking valve.

16. The apparatus of claim 15, wherein the connecting element bears against the sealing element and at least partially supports the sealing element.

17. The blocking apparatus as claimed in claim 13, further comprising a fixing element for flexibly and resiliently mounting the sealing element.

18. The apparatus of claim 17, wherein the fixing element comprises a disk spring.

19. The apparatus of claim 13, wherein the inliner is metallic and the insulating material is a refractory material.

20. The apparatus of claim 1, wherein the rotation device comprises a shaft extending along the rotation axis.

21. The apparatus of claim 1, wherein the sealing element comprises a seat ring at the opening and shaped for receiving and sealing to the closure body.

22. The apparatus of claim 1, wherein the spacer is adjustable hydraulically to act on the closure body.

23. The apparatus of claim 1, wherein the spacer is adjustable to move the closure body along the axis of rotation.

24. A method for operating a blocking apparatus for blocking or sealing off a line in which dust-laden gases or gases laden with solid particles are transported, wherein the apparatus includes a movable closure body, a sealing element against which the closure body is placed when the line is being blocked, a first actuating device for the closure body by which the closure body is placed against the sealing element when the line is being blocked by rotation of the closure body about an axis of rotation, and a second actuating device for the closure body which is hydraulically actuated, the method comprising:

moving the closure body by means of a suitable flexible linkage to the actuating device along the direction of the axis of rotation and also in a direction which is perpendicular to the axis, such that the closure body slides freely on the sealing element, and applying an external force by the second actuating device to alter the location and position of the closure body along the direction of the axis of rotation or in a direction which is perpendicular to the axis, at least during operation of the blocking apparatus.

25. The method as claimed in claim 24, further comprising sealing a connecting location between the closure body and the actuating device with respect to the environment, to prevent ingress of impurities.

26. The method as claimed in claim 24, wherein the actuating device includes a cavity which has at least two openings, including a first opening arranged in a front part facing the closure body, and wherein gas pressure is developed at the first opening for controlling a position of the actuating device.

27. The method as claimed in claim 26, wherein the first opening is arranged in a region of the sealed connection between the closure body and the actuating device.

28. The method as claimed in claim 26, wherein a second opening of the cavity is closed off in a gastight manner.

29. The method as claimed in claim 26, further comprising filling the cavity with a medium at a higher pressure than ambient pressure surrounding the blocking apparatus.

30. The method as claimed in claim 29, further comprising holding the medium in the cavity substantially at a constant pressure level above ambient pressure surrounding the blocking apparatus.

\* \* \* \* \*